United States Patent [19]

Ueda

[11] Patent Number: 4,970,673
[45] Date of Patent: Nov. 13, 1990

[54] ELECTRONIC APPARATUS EFFECTING VOICE OUTPUT

[75] Inventor: Hiroyuki Ueda, Kawasaki, Japan

[73] Assignee: Canon Kabushiki Kaisha, Tokyo, Japan

[21] Appl. No.: 281,972

[22] Filed: Nov. 30, 1988

Related U.S. Application Data

[63] Continuation of Ser. No. 9,283, Jan. 30, 1987, abandoned, which is a continuation of Ser. No. 809,848, Dec. 17, 1985, abandoned, which is a continuation of Ser. No. 597,202, Apr. 5, 1984, abandoned, which is a continuation of Ser. No. 461,403, Jan. 27, 1983, abandoned, which is a continuation of Ser. No. 199,265, Oct. 21, 1980, abandoned.

[30] Foreign Application Priority Data

Oct. 24, 1979 [JP] Japan ................................ 54-137234

[51] Int. Cl.[5] .............................................. G06F 3/16
[52] U.S. Cl. ........................ 364/710.01; 364/709.12; 364/710.12; 381/51
[58] Field of Search ..................... 364/705.05, 709.01, 364/709.12, 710.01, 710.12, 715.01, 705.06; 381/50, 51

[56] References Cited

U.S. PATENT DOCUMENTS

| | | | |
|---|---|---|---|
| 4,000,565 | 1/1977 | Overby et al. | 364/710 |
| 4,012,725 | 3/1977 | Spangler et al. | 364/200 |
| 4,117,542 | 9/1978 | Klausner et al. | 364/709 |
| 4,145,742 | 3/1979 | Olander, Jr. et al. | 364/709 |
| 4,211,892 | 7/1980 | Tanimoto et al. | 364/710 |
| 4,276,444 | 6/1981 | Tanimoto et al. | 364/710 |
| 4,293,915 | 10/1981 | Carpenter et al. | 364/493 |
| 4,301,511 | 11/1981 | Shimizu | 364/709 |

*Primary Examiner*—Gary Chin
*Attorney, Agent, or Firm*—Fitzpatrick, Cella, Harper & Scinto

[57] ABSTRACT

A calculator providing information in the form of synthesized voice includes a start instruction entering device for entering a start instruction which causes read-out of information to be started, a stop instruction entering device for entering a stop instruction which causes read-out of information to be stopped, a memory having stored therein the information, a read-out circuit coupled to the start instruction entering device and the stop instruction entering device to read out the information from the memory on the basis of the start instruction from the start instruction entering device and stop the read-out of the information from the memory on the basis of the stop instruction from the stop instruction entering device, and an output device for providing, in the form of voice, the information read out from the memory by the read-out circuit.

7 Claims, 8 Drawing Sheets

| NO | KEY DEPRESSED | NO | KEY DEPRESSED |
|---|---|---|---|
| 1 | CLR | 21 | 3 |
| 2 | 2 | 22 | 3 |
| 3 | + | 23 | + |
| 4 | 3 | 24 | 4 |
| 5 | + | 25 | + |
| 6 | 4 | 26 | 5 |
| 7 | + | 27 | = |
| 8 | 5 | 28 | C |
| 9 | = | 29 | REP |
| 10 | ST/SP | 30 | 1 |
| 11 | ST/SP DURING UTTERANCE "FOUR PLUS" | 31 | 2 |
| 12 | BK | 32 | 3 |
| 13 | BK | 33 | 4 |
| 14 | ST/SP | 34 | + |
| 15 | C DURING UTTERANCE | 35 | 5 |
| 16 | ST/SP | 36 | 6 |
| 17 | ST/SP DURING UTTERANCE "FOUR PLUS" | 37 | 7 |
| 18 | C | 38 | 8 |
| 19 | ST/SP | 39 | 9 |
| 20 | ST/SP DURING UTTERANCE "THREE PLUS" | 40 | + |

FIG. 4

ELECTRONIC APPARATUS EFFECTING VOICE OUTPUT

This application is a continuation of application Ser. No. 009,283 filed Jan. 30, 1987, now abandoned; which was a continuation of application Ser. No. 809,848 filed Dec. 17, 1985, now abandoned; which was a continuation of application Ser. No. 597,202 filed Apr. 5, 1984, now abandoned; which was a continuation of application Ser. No. 461,403 filed Jan. 27, 1983, now abandoned; which was a continuation of application Ser. No. 199,265 filed Oct. 21, 1980, now abandoned.

BACKGROUND OF THE INVENTION

1. Field of the Invention

This invention relates to a calculator adapted to provide numerical value information or operation instructions in the form of voice.

2. Description of the Prior Art

Those of conventional calculators which have a checking function are provided with a plurality of storing registeres so that numerical value information, operation instructions or results of operation by an operator's key depression is stored or registered in the storing registers and the contents of the registers are read out. These calculators are of the type which only causes the operator to notice wrong input, if any, and when the operator has noticed a wrong input, a procedure of re-entering a series of information, re-checking and obtaining a correct result of operation has been required. This has meant that much time and labor is required for the re-entering or the re-checking.

SUMMARY OF THE INVENTION

It is an object of the present invention to eliminate the above-noted disadvantages and thereby save labor required for office work or the like.

It is another object of the present invention to provide a calculator having the function of storing numerical value information or operation commands entered by the operator, with the function of reading aloud the stored numerical value information or operation commands (hereinafter referred to as the checking function), with the function of easily correcting the stored numerical value information or operation commands and further with the function of re-executing in accordance with a series of stored information. This calculator is also capable of obtaining the result after correction on the spot.

It is still another object of the present invention to provide a calculator which causes the information stored in a memory to be changed when voice output is stopped.

It is yet still another object of the present invention to provide a calculator which effects voice output retrospectively by two or more depressions of a specific key when voice output is stopped.

It is a further object of the present invention to provide a calculator which is provided with means for automatically re-executing an operation in accordance with the contents of the memory.

It is a further object of the present invention in which fair printing information can be obtained during the re-execution.

It is a further object of the present invention to provide a calculator having means for discontinuing the reading aloud or the re-execution by depression of a specific key.

BRIEF DESCRIPTION OF THE DRAWINGS

The invention will become fully apparent from the following detailed description thereof taken in conjunction with the accompanying drawings; in which:

FIG. 4 is a key input illustration useful for understanding the sequences shown in FIGS. 3A through 3E.

DESCRIPTION OF THE PREFERRED EMBODIMENTS

Figure 1:
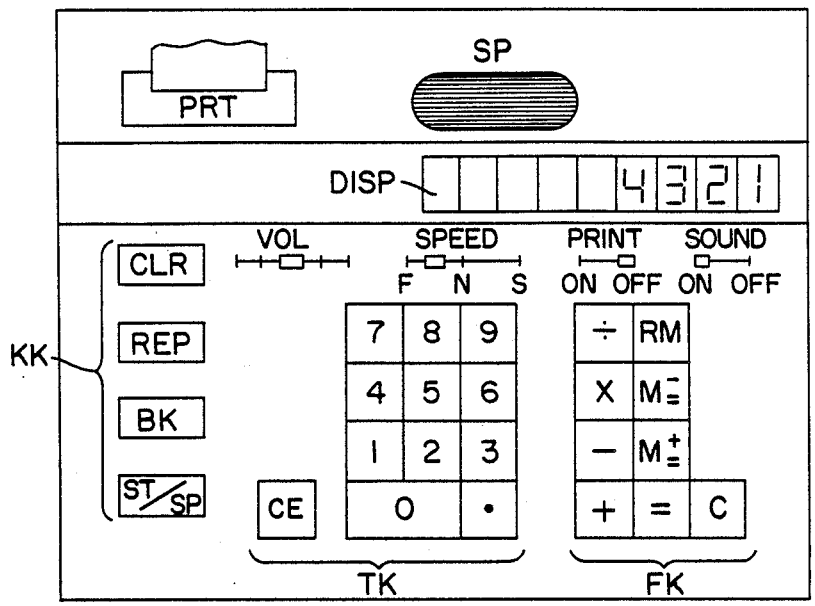
FIG. 1 is a view showing the appearance of the calculator according to the present invention.

An embodiment of the present invention will hereinafter be described. FIG. 1 is a view showing the appearance of the calculator according to the present invention. In FIG. 1, SP designates a loudspeaker for producing voice, PRT denotes a printer for recording input information and results, and DISP designated a display device for visually displaying numerical value information. KK designates a group of key switches. The key switch group KK will be described. A key CLR is one for effecting the initialization for a checking memory device, and a key REP is one for re-executing a series of key input information registered in the checking memory device. A key BK is one for causing the numerical value information and operation commands before one step to be again uttered during the checking, and a key ST/SP is one for temporarily stopping the checking and imparting an actuation for re-start.

FK designates operational function keys which include "×", "÷", "+" and "−" keys for instructing operations of four fundamental arithmetical rules, an "RM" key for calling out the contents of an independent memory, "M=" and "M=" keys for operating the contents of the independent memory and the contents of an operational memory, and a "C" key for clearing the contents of the operational memory.

TK denotes a key group for entering numerical value information and in the form of decimal data.

Further, there are the following controls. VOL designates a slide lever for adjusting the volume during the voice outputting. SPEED designates a slide switch for regulating the time between respective words during the voice outputting. PRINT denotes a slide switch activated or inactivated for the function of a printer. And SOUND designates a slide switch activated or inactivated for a voice output.

Figure 2:
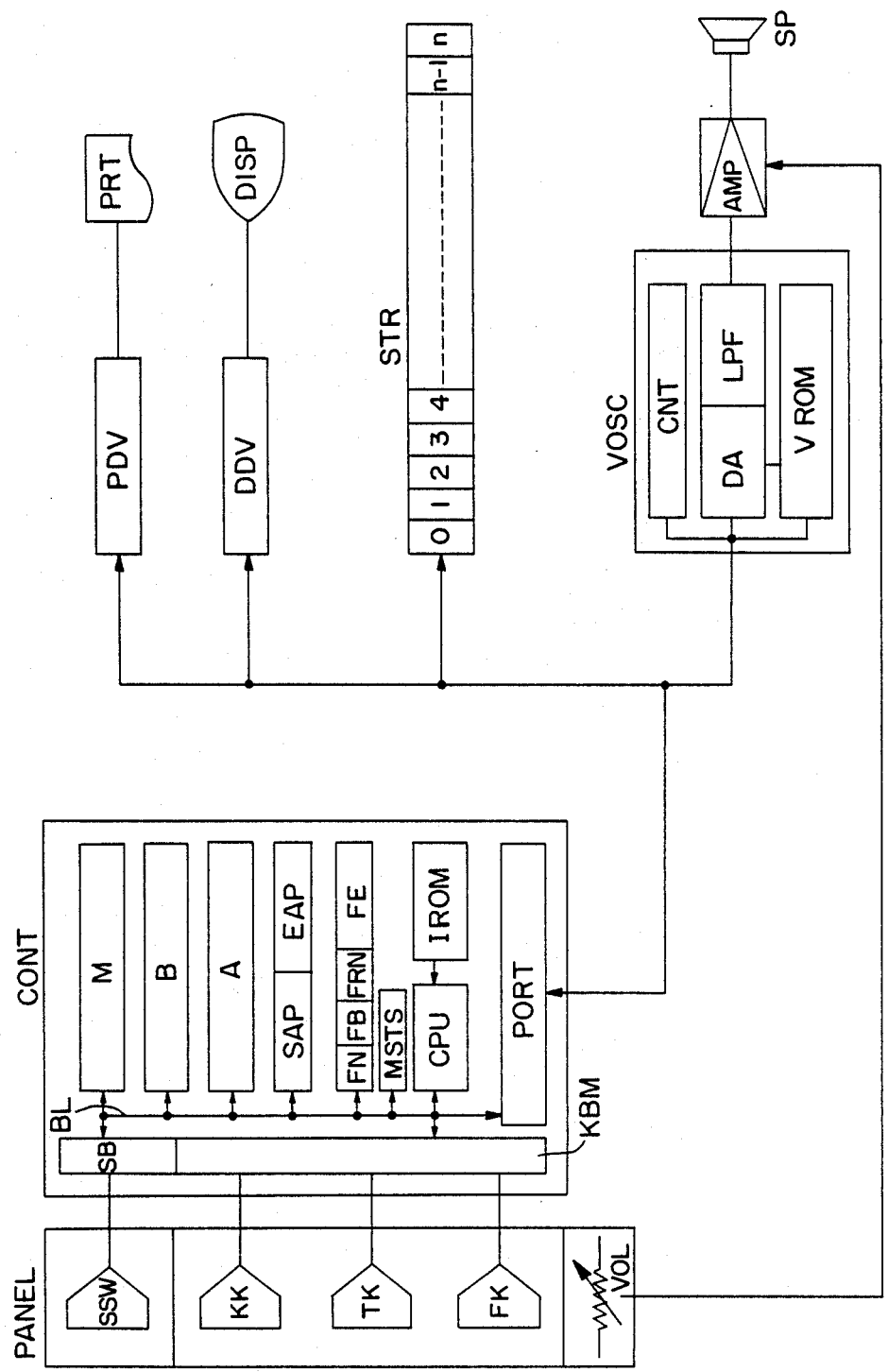
FIG. 2 is a diagram illustrating the construction of an embodiment of the present invention.

FIG. 2 is a block diagram of the calculator shown in FIG. 1. PANEL designates an input circuit for the key switches shown in FIG. 1, and SSW designates a slide switch group generically including the slide switchs SPEED, PRINT and SOUND shown in FIG. 1. VOL is a slide lever VOL corresponding to that shown in FIG. 1, and KK, TK and FK are key switches likewise corresponding to those of FIG. 1. The interior of an operation control CONT is constituted as follows: SB designates a buffer memory for storing the condition of the slide switch group SSW, and a processor CPU which will hereinafter be described can arbitrarily refer to it through a bus line BL. The buffer memory SB is examined when the propriety of the print output, the propriety of the voice output and the degree of interval between utterances are judged. KBM designates a buffer memory for receiving and storing a key input signal when a key switch has been depressed, and the processor CPU can also arbitrarily refer to this through the bus line BL. A, B and M denote operational registers (memories) for carrying out the operations which are the fundamental functions of the calculator, and the operational algorithm thereof is similar to the conventional one. SAP designates a register which stores a start address pointer, and EAP denotes a register which stores an end address pointer. The register SAP is used to store the start address for a register STR, and the register EAP is used to store the end address for the register STR. The register SAP is a pointer for showing the pertinent address of the register STR when read-out of the numerical value information or the operation command stored in the register STR is effected. The register EAP is a pointer for showing the pertinent address when write-in of the numerical value information or the operation commands are effected. Also, the registers SAP and EAP themselves are read out or written in by the processor CPU through the bus line BL. A register MSTS for storing machine statuses is the most important register to the present invention and, as will later be described, in the present embodiment, it stores therein four machine statuses and as a matter of course, the processor CPU can arbitrarily effect readout and write-in through the bus line BL. FN, FB and FRN are flip-flops which can be arbitrarily set and reset by the processor CPU through the bus line BL, and the processor CPU can arbitrarily refer to the outputs of these flip-flops. The flip-flop FN is set when there is an input of numerical value information by the key switch group TK, and is reset when the unit execution by the operation commands (for example, in the case of depression of the + key of the function keys, FK, effecting utterance, effecting the addition of the operational registers A and B, effecting the print output and effecting the display thereof) has been terminated. The flip-flop FB is for eliminating the contradiction in sequence of information utterance which occurs when the key ST/SP has been depressed immediately after the depression of the key BK as will later be described, and it is set by the depression of the key BK and is reset by the depression of the key ST/SP. The flip-flop FRN is set when correction has been made during the checking, and eliminates the contradiction in sequence which occurs during the correction. FE designates a group of flip-flops (for example, for discriminating whether or not a decimal point key has been depressed). As will be understood from the foregoing description, the processor CPU can directly control all of the buffer memories, registers and flip-flops within the operation control CONT, and effects the processing, judgement, etc. A read only control memory (I ROM) positioned within the operation control CONT accumulates therein the information code to the CPU for controlling the interior of the CONT, and stores therein the control procedure shown in FIG. 3. Accordingly, the processor CPU controls the interior of the operation control CONT while referring to the control memory I ROM. Input and output ports (PORT) operate while being controlled by the processor CPU and are connected to drivers PDV, DDV and registers STR, VOSC which will later be described.

The PDV is a driver for driving the printer, and the DDV is a driver for driving the display device. The printer PRT and the display device DISP as output equipment are connected to the drivers PDV and DDV, respectively. Further, VOSC is an voice synthesizer, to the output portion of which the speaker SP is connected through an amplifier AMP to effect utterance. The amplifier AMP may control the gain by the slide lever VOL.

STR is a register in which addresses are individually set, and key input information or the like enters thereinto. The voice synthesizer VOSC accumulates in a read only memory (VROM) for voice output the information comprising the voices for words (for example, one, two, plus, etc.) rendered into specimens. When an actuation signal or the like is applied from outside of the voice synthesizer VOSC, information is taken out from the memory VROM by a control circuit CNT, is converted by a digital-analog converter DA from digital to analog form and is integrated by a low-pass filter LPF and put out.

Figure 3A:
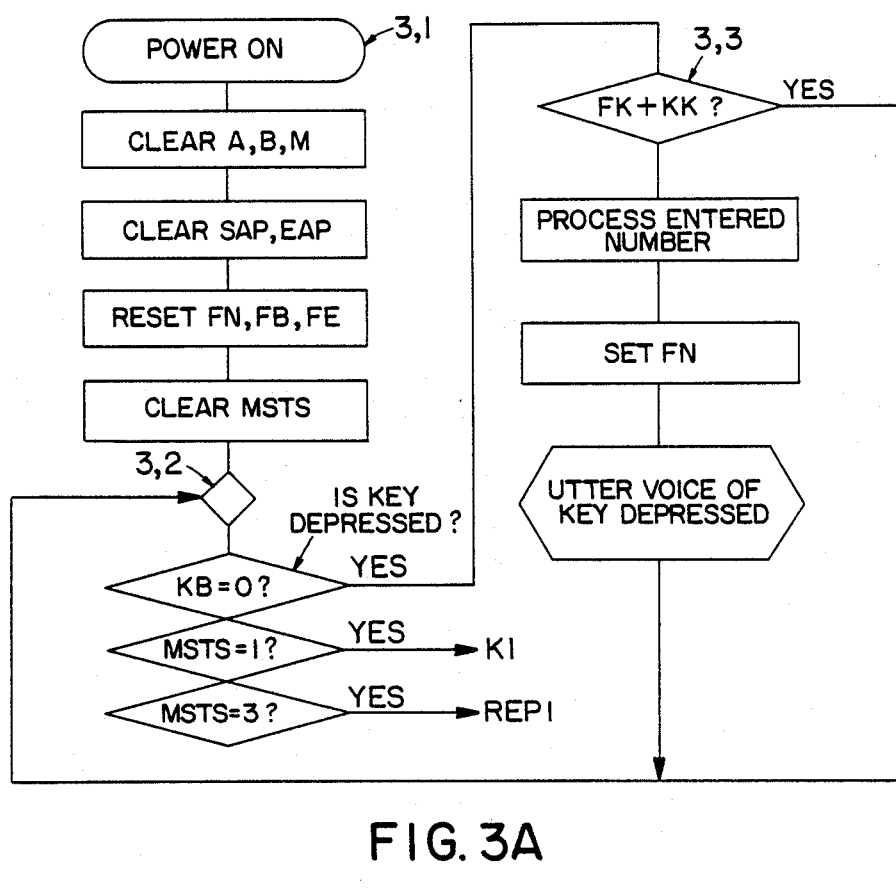
FIGS. 3A through 3E, when combined as shown in FIG. 3, are a diagram showing the control sequences.
Figure 3:
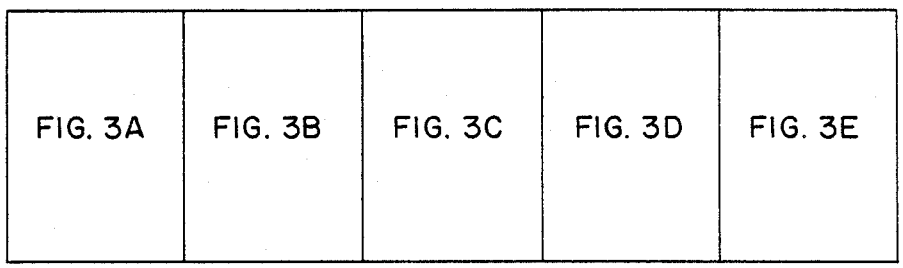
Figure 3B:
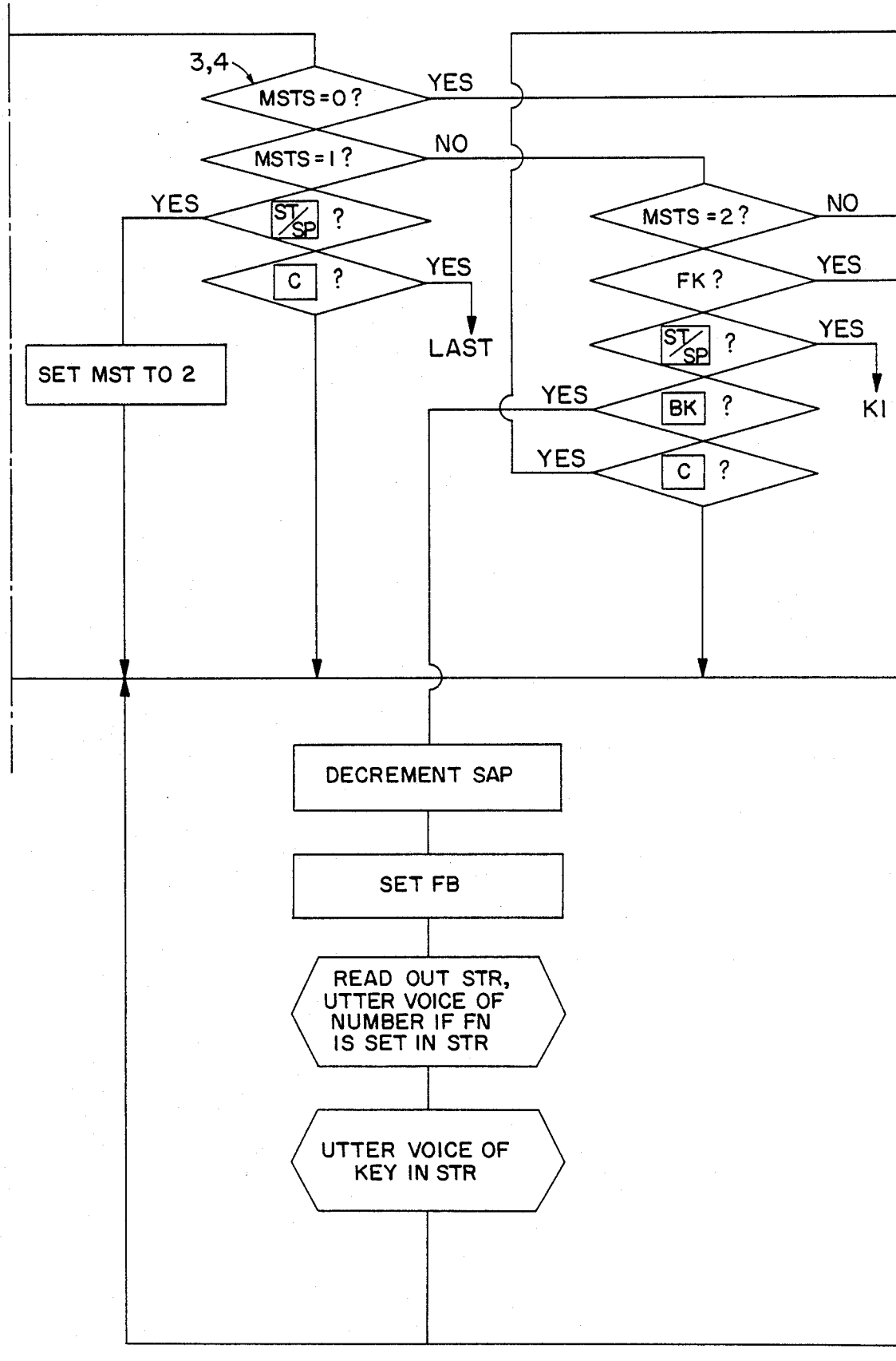
Figure 3C:
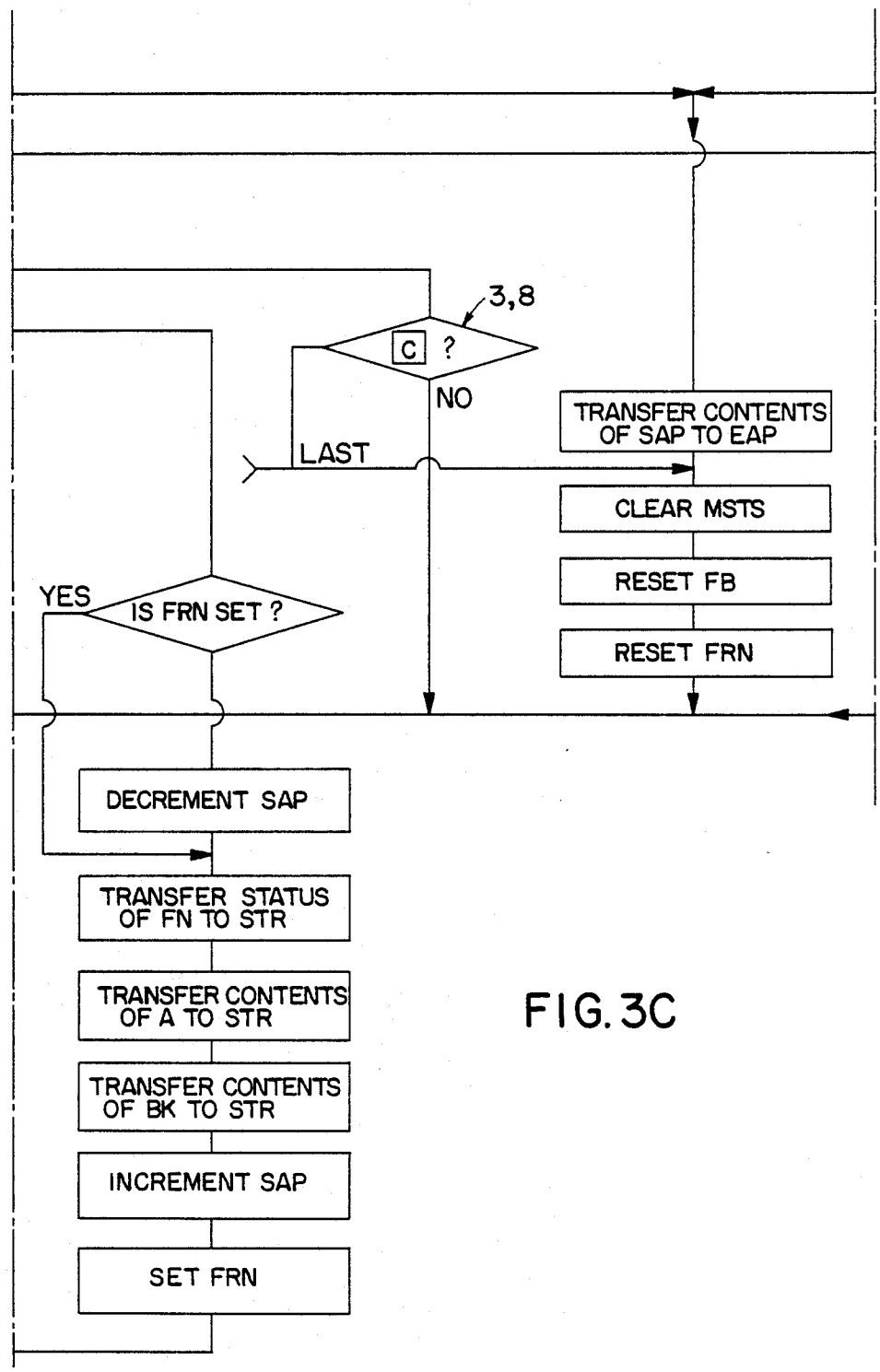
Figure 3D:
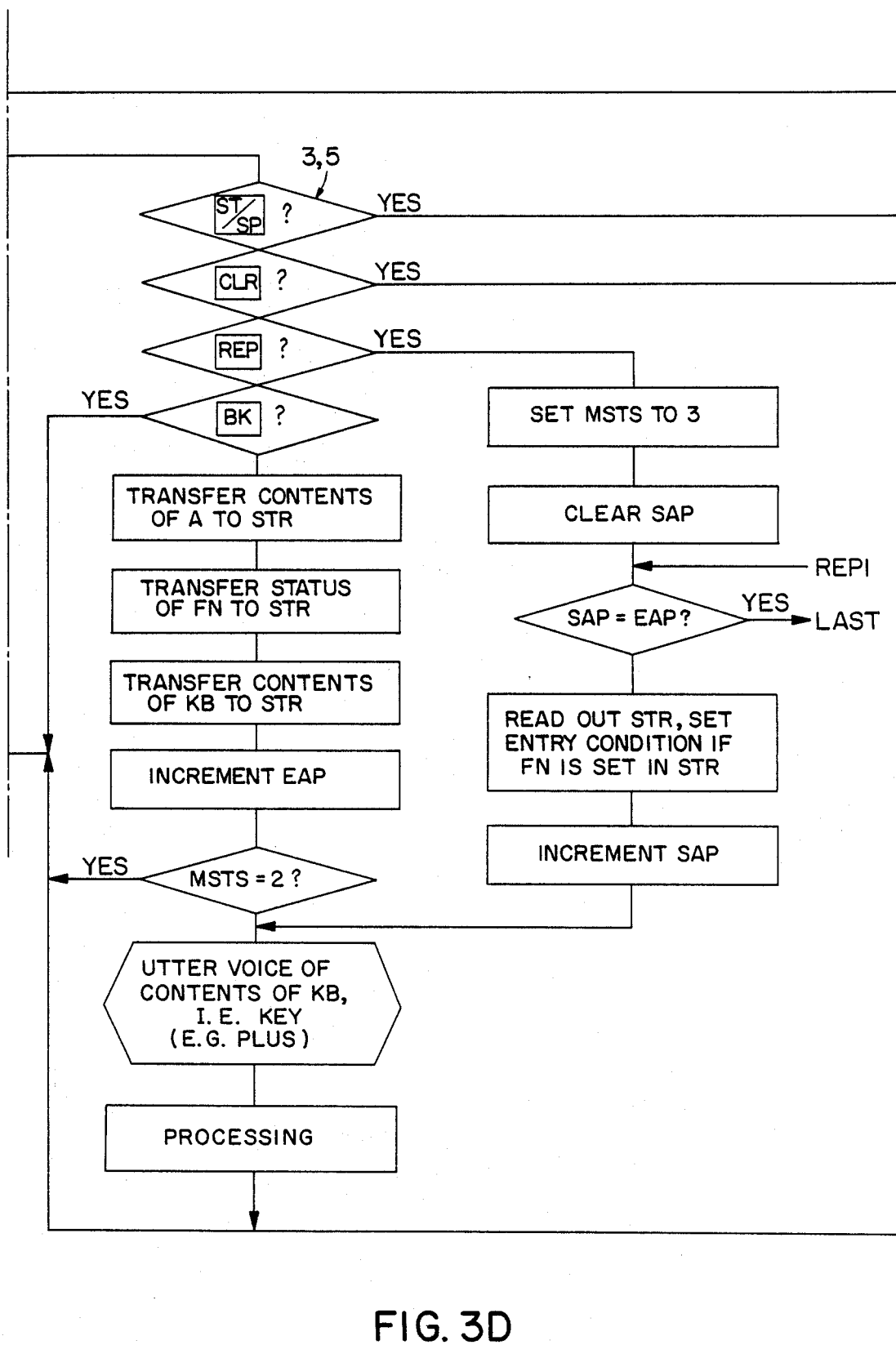
Figure 3E:
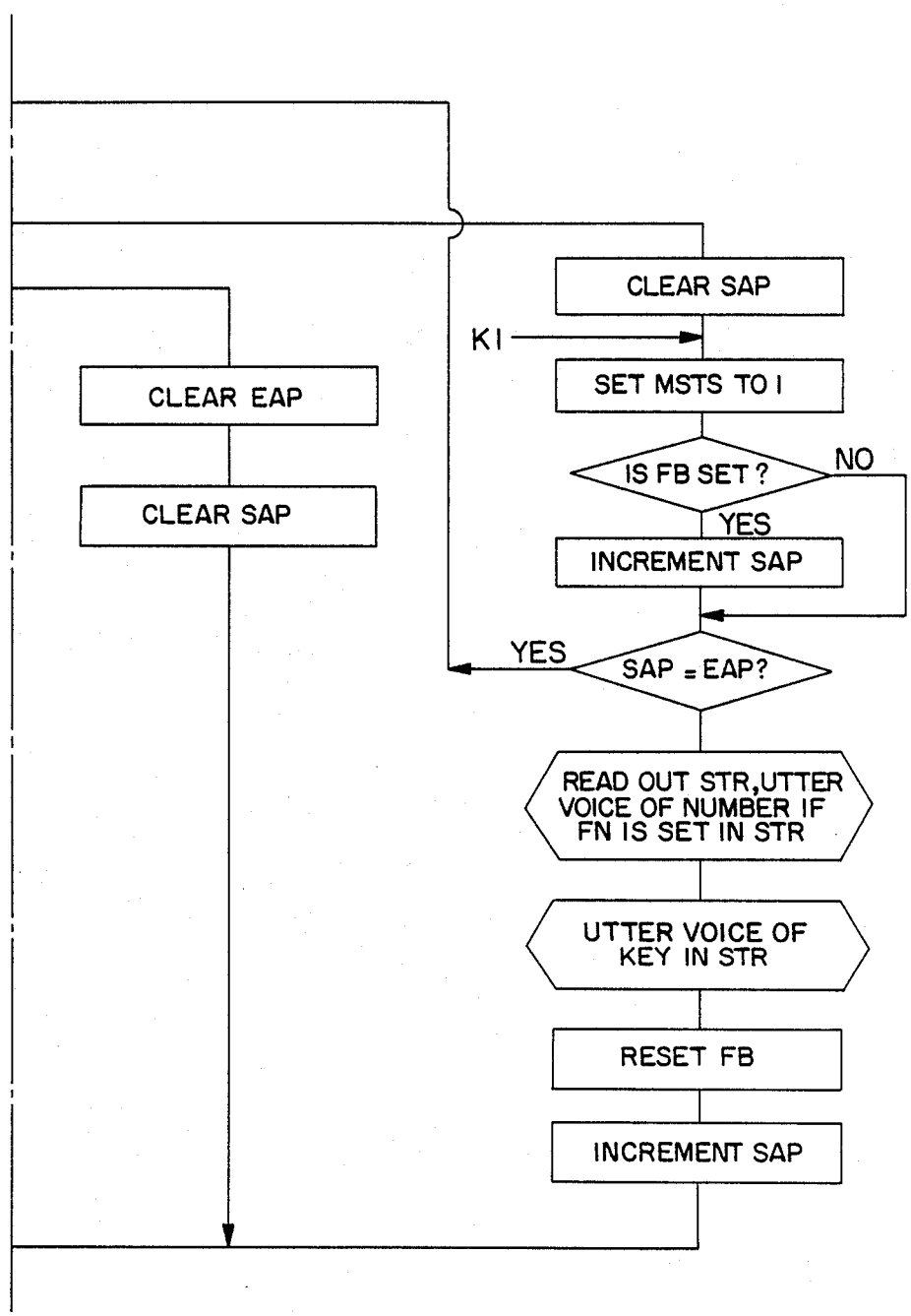

The operation of the embodiment having the above-described construction will now be described. In FIG. 3, step 3.1 is the starting point in POWER.ON, and in step 3.1 to step 3.2, the clear and reset of registers A, B, M, SAP, EAP or flip-flops FN, FB, FE are effected. Step 3.2 is a return position (a return position after the unit execution) and also is a starting point during operation. Immediately after the step 3.2, there is a step for judging the presence of depression of a key and when a key has been depressed, classification is effected by the nature of the key (FK, KK, TK) depressed at step 3.3. When the key switch group TK has been depressed, the CPU effects the processing of an entered number, sets FN and utters the voice for the depressed key (namely, one, two, three or the like) by using the voice synthesizer VOSC. When one of the function keys FK or the key switch group KK has been depressed, rough classification is effected at step 3.4 and subsequent steps to examine the effectiveness or the meaning of the key (the ST/SP key, etc. have a plurality of functions) depending on the contents of the register MSTS.

In order to specifically describe the embodiment, it is assumed that key operation has occurred in the sequence shown in FIG. 4 from immediately after POWER.ON. At No. 1, the operation of the key CLR is effected and therefore, the control sequence shifts to step 3.3, and further shifts to step 3.4. At this time, initiated by POWER.ON, register MSTS=0 and therefore, the control sequence shifts to step 3.5. At step 3.5 and subsequent steps, when the key CLR is depressed, the registers EAP and SAP are cleared and return to the return position of step 3.2. That is, by the key CLR, the write-in address of the register EAP is cleared and the read-out address of the register SAP is also cleared. Subsequently, when operation of No. 2 key "2" has been effected, the "2" not being a function key FK or a key switch group key KK (it is TK), at step 3.3, the processor CPT processes the entered number and sets the flip-flop FN, and accesses the memory VROM, whereupon the speaker SP utters "2" and the control sequence returns to step 3.2. Subsequently, when the key operation No. 3 "+" key has been operated, the control sequence shifts to step 3.3, and since the key "+" is a part of the function keys FK, the process shifts to step 3.4. At step 3.4, the content of the register MSTS is "0" as before, and therefore, the control sequence shifts to step 3.5. At step 3.5 and subsequent steps, the key depressed is none of the keys ST/SP, CLR, REP and BK. Accordingly, the content (2) of the register A, the content of the flip-flop FN for showing that the content of the register A is provided by the entered number, and the content (+) of a key buffer memory (KBM) are transferred (written in) to the register STR and the register EAP is incremented in preparation for the next writing into the register STR, whereafter the control sequence returns to step 3.2. Of course, No. 4 to No. 9 of the key operations are a combination of No. 2 and No. 3 and with regard to the register EAP at the point of time whereat No. 9 has been terminated, EAP=4.

Key operation No. 10 is the depression of the key ST/SP and since this is a part of the function keys KK, the control sequence shifts to step 3.4. At step 3.4, MSTS=0 and therefore, the control sequence shifts to step 3.5, at which the processing of the key ST/SP is effected. That is, the register SAP is cleared and set to MSTS=1. The flip-flop FB is not set after that and therefore, comparison between the registers SAP and EAP is effected without incrementing the register SAP. Now EAP=4 and SAP=0 and therefore, read-out from the register STR is effected from the position corresponding to the content of the register SAP. Since the content first read out is the numerical value (2) (No. 2 is FIG. 4) provided by the entered number (FN being in set condition), "two" is uttered and with respect to the "+" key (No. 3 in FIG. 4) depressed immediately after this numerical value, "plus" is uttered. Thereafter, the register SAP is incremented in preparation for the next read-out. When this has been terminated, the control sequence returns to step 3.2, at which no key is depressed and so, the following judgment is effected. That is, MSTS=1? Now MSTS=1 and therefore, the control sequence jumps to K1 to process MSTS=1 by the first judgment, and processing similar to that when the key ST/SP has been depressed is carried out, and subsequent to the aforementioned "two plus", "three plus" is effected, and then "four plus" is likewise effected. In this manner, the contents of the register STR are successively uttered. When the key ST/SP is again operated during the time that this "four plus" is uttered (No. 11 is FIG. 4), the control sequence shifts to step 3.3 by judgment of the presence of key depression immediately after step 3.2, and further shifts to step 3.4. At step 3.4, MSTS=1 and therefore, the control sequence shifts to step 3.6, at which the depression of the key ST/SP is recognized and the register MSTS is set to MSTS=2, whereafter the control sequence returns to step 3.2. In this condition, unless a key is depressed, the control sequence stays at step 3.2. In this manner, the contents of the register STR are called out by operation of the key ST/SP and the call-out is interrupted. When the key operation of No. 12 has been effected, the control sequence passes through steps 3.3 and 3.4 and MSTS=2 and therefore, the control sequence shifts to step 3.7. At step 3.7 and subsequent steps, it is known that the key depressed is the key BK, and the processing thereof is effected. The processing is carried out by decrementing the register SAP to "3" and setting the flip-flop FB and executing the same procedure as the method of utterance effected by the key ST/SP. At this time, SAP=3 and the utterance is "four plus", that is, repeated reading is being effected. Next, when the key operation of No. 13 has been effected, the same result occurs as that obtained by the previous depression of the key BK, but SAP=2 and therefore, the utterance is "three plus" which means the original step-back reading. When the key operation of No. 14 has been effected, the control sequence passes from step 3.2 through steps 3.3, 3.4 and 3.7 and jumps to K1. Here, the register MSTS is again set to MSTS=1 and the flip-flop FB is set and therefore, the register SAP is incremented (SAP=3), and "four plus" is first read out and uttered from the register STR. Next, when the key operation of No. 15 has been effected, the control sequence passes through steps 3.3, 3.4 and 3.6 to recognize the depression of the key C, and the sequence shifts to the process for interrupting continuous reading (checking). That is, the register MSTS is set to MSTS=0 and the flip-flops FB and FRN are reset. Accordingly, depending on the condition of the register MSTS, the action of the key C becomes different.

At this time, the register EAP is of the same content as that before the checking (EAP=4) and the next write-in succeeds to the key input immediately before the checking is effected. The key operations of No. 16 and No. 17 are similar to the key operations of No. 10 and No. 11, and the key operation of No. 18 refers to the case where the key C has been depressed at MSTS=2. The processing corresponding to this key depression is such that the control sequence passes from step 3.2 through steps 3.3, 3.4 and 3.7 to recognize the depression of the key C and the contents of the register SAP are transferred to the register EAP to bring about MSTS=0 and the flip-flop FB is reset to return to the return position 3.2. Accordingly, the contents of the register EAP have been changed and therefore, the next write-in immediately follows the previous utterance and in this example, it is stored in the register STR [5=] but it is apparently erased.

The key operations of No. 19 and No. 20 are similar to the key operations of No. 10 and No. 11. No. 21 and No. 22 are the processing of the entered number at MSTS=2, and are the same as the processing of the entered number at MSTS=0. No. 23 is the depression of an FK key at MSTS=2, and the control sequence passes from step 3.2 through steps 3.3 and 3.4 and at step 3.7. The depressed key is the function key FK and therefore, in the same manner as the case of MSTS=1, writing into the register STR is effected. However, this write-in is effected by using the register SAP as an exception. That is, the rewriting is effected for the immediately preceding utterance "three plus" and therefore, the register SAP is decremented and this address pointer is used. The FRN is referred to at this point. The key operations of No. 24 to No. 27 are similar to the key operations of No. 21 to No. 23. No. 28 is similar to No. 18. Accordingly, at the point of time whereat No. 18 has been terminated, EAP=4, SAP=4 and MSTS=0. Next, when the key REP of No. 29 has been depressed, the control sequence passes from step 3.2 through steps 3.3, 3.4 and 3.5 to recognize the depression of the key REP and bring about MSTS=3, and the register SAP is cleared, and the registers SAP and EAP are compared to know the point of time of termination, and the address of the register STR indicated by the register SAP is read out and if FN is stored in its set condition, the processing similar to that effected on the entered number is effected to increment the register SAP, and operation is carried out by one of the keys FK stored. When this unit execution is terminated, the control sequence returns to step 3.2, at which what has been described above is repeated in a manner similar to the case of MSTS=1. That is, re-execution is automatically effected. When SAP and EAP have become equal to each other, MSTS=0 is automatically brought about and the control sequence returns to step 3.2. In FIG. 4, No. 30 to No. 40 are the additions at MSTS=0, and EAP at the point of time whereat No. 40 has been terminated is EAP=6.

Figure 5:
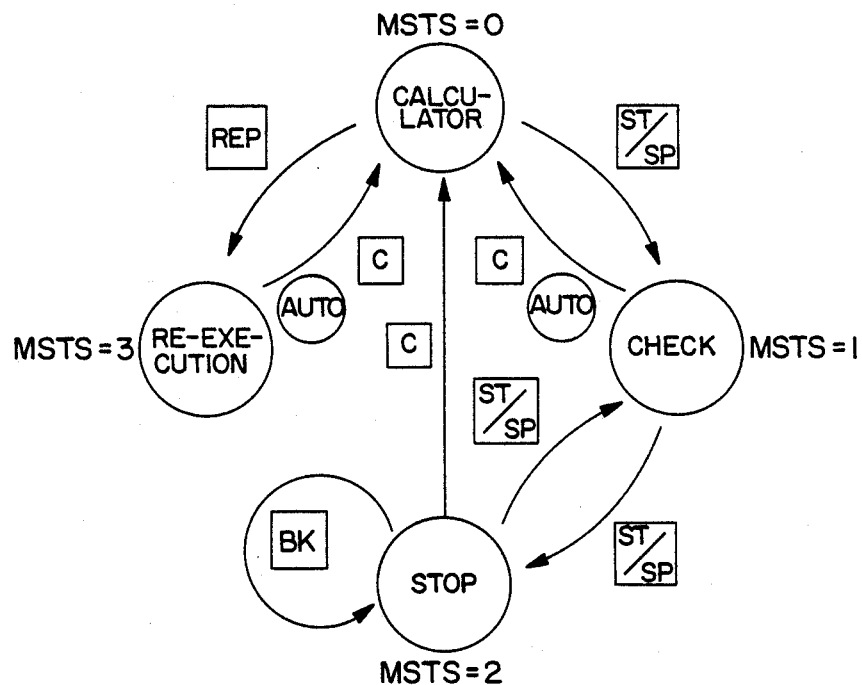
FIG. 5 is a state diagram useful for understanding the sequences shown in FIG. 3.

As will be apparent from the foregoing description, the processing and control are roughly dispersed into four types by the register MSTS which shows the machine condition. Further, to make the control structure concrete, the following appellations are given to the contents of the register MSTS. The case of MSTS=0 is called the calculator condition, the case of MSTS=1 is called the check condition, the case of MSTS=2 is called the stop condition, and the case of MSTS=3 is called the re-execution condition. The relation between the respective conditions can change as shown in FIG. 5 from the contents of FIG. 3.

Also, in the present embodiment, each condition is identified by the use of the register MSTS and therefore, it is possible to judge the effectiveness of the keys when depressed and it is also possible to identify the functions even for a key signal having a plurality of functions. Accordingly, by depressing a specific key, as shown in FIGS. 3 and 5, it is possible to change from the condition of check, stop or re-execution to the calculator condition. In this present embodiment, where MSTS=1 and MSTS=3, by depressing the key C, the condition changes to MSTS=0 without rewriting the register EAP and, when the key C has been depressed when MSTS=2, the condition changes after the contents of the register SAP have been rewritten into the register EAP. That is, when the key C has been depressed in the case of MSTS=1 and MSTS=3, register STR is not at all erased apparently, thus enabling the interruption of the check and the re-execution. In the case of MSTS=2, SAP and subsequent registers are erased to enable unnecessary information of the register STR to be erased apparently. As has previously been described, the automatic change of the condition is effected by the comparison between SAP and EAP.

On the other hand, in the case of MSTS=2, the same processing and control as in the case of MSTS=0 are effected, thus enabling the rewriting (i.e. correction) into the STR to be effected.

On the other hand, when the key BK has been depressed in the stop condition, the register SAP is decremented and the read-out is effected from the register STR and therefore, the first depression of the key BK in the case of MSTS=2 has apparently the function of repeat. However, when the condition has been again changed to the check condition by the key ST/SP immediately after the depression of the key BK, the first reading aloud becomes the same as the utterance effected by the previous depression of the key BK and this is not practical, but includes a contradiction. Therefore, to enhance the practicality, the flip-flop FB is provided so that in the case of MSTS=1, it is referred to and reset.

Now, during the re-execution condition, information is read out from the register STR and with regard to those having entered numbers, entering of numbers is automatically effected to execute the operation command and therefore, if the switch PRINT is closed, the processing portion CPU refers to the SAP and sends the contents of the register STR to the printer PRT, thus enabling the information by a fair print after correction to be obtained.

The following points may be mentioned as the effects of the present invention. Correction can be easily made during check and when a wrong input is noticed, it is not necessary to enter all necessary information. The operator can temporarily stop the instrument during check and retrospectively effect the check and can thus carry out the checking work positively and, since the first depression of the key BK is the repeat function, it is very practical. By the key C, the instrument can shift from the check, re-execution or stop condition to the normal condition and interruption of the work can be effected arbitrarily and especially, depression of the key C can erase the unnecessary information stored in the checking memory device.

Also, by depression of the key CLR, the checking memory device can be initialized and unnecessary information can be erased. Check can be started and stopped by the key ST/SP and thus, the checking work can be readily effected. During the re-execution, the printer can be driven and a fair record can be put out frequently. Also, in the case of the re-execution, the presence or absence of utterance can be selected as in the normal case and therefore, check can be effected at the same time.

What I claim is:

1. An apparatus providing information, comprising:
   input means for entering information and instructions;
   memory means, connected to said input means, for storing information input thereby;
   an operating status memory for storing operating status information representing an operating status of said apparatus, said operating status information stored in said operating status memory being changed in response to each of said instructions entered from said input means;
   start instruction means connected to said input means and to said operating status memory for generating a start instruction on the basis of said operating status information stored in said operating status memory for causing read-out of information from said memory means to be started;
   stop instruction means connected to said input means and to said operating status memory for generating a stop instruction on the basis of said operating status information stored in said operating status memory for causing read-out of information from said memory means to be stopped;
   output means for providing, in the form of a voice output, said information stored in said memory means; and
   control means being operative, upon generation of said start instruction by said start instruction means and generation of said stop instruction by said stop instruction means, to control said output means to provide, in the form of a voice output, said information stored in said memory means; for discriminating an instruction entered from said input means while said output means provides, in the form of a voice output, said information stored in said memory means; and for controlling said output means on the basis of the status of said operating status memory after said output means has terminated the output, in the form of a voice output, of the information stored in said memory means.

2. An apparatus according to claim 1, wherein said output means comprises a voice memory storing therein voice information corresponding to said information stored in said memory means.

3. An apparatus according to claim 1, wherein said input means includes numerical keys.

4. An apparatus according to claim 1, wherein said operating status memory includes counter means.

5. An apparatus for processing information, comprising:
- input means having a key for providing a start instruction, a stop instruction, and a clear instruction;
- an operating status counter means for storing operating status information;
- memory means for storing information representing voice data;
- address means for providing an address instruction to access said memory means;
- output means responsive to said input means for providing, in the form of a voice output, said information stored in said memory means; and
- control means connected to said input means and to said operating status counter means for generating a start control signal on the basis of said operating status information stored in said operating status counter means to cause read-out of information from said memory means to be started; for changing operating status information in said operating status counter means and for generating a stop control signal on the basis of said operating status information stored in said operating status counter means in order to generate a stop instruction on the basis of said operating status information stored in said operating status counter means thereby to cause read-out of information from said memory means to be stopped; and, after said stop control signal has terminated the output from said output from said output means, for changing the address instruction for accessing said memory means by said address means, and for changing the address instruction provided by said address means on the basis of said operating status information stored in said operating status counter means when said clear instruction is entered by said input means.

6. An apparatus according to claim 5, wherein said control means causes the address instruction for accessing said memory means by said address means to change backwardly.

7. An apparatus according to claim 5, wherein said input means includes keyboard means.

* * * * *

UNITED STATES PATENT AND TRADEMARK OFFICE
CERTIFICATE OF CORRECTION

PATENT NO. : 4,970,673
DATED : November 13, 1990
INVENTOR(S) : Hiroyuki Ueda

It is certified that error appears in the above-identified patent and that said Letters Patent is hereby corrected as shown below:

COLUMN 1

Line 23, "registeres" should read --registers--.

COLUMN 2

Line 26, "designated" should read --designates--;
Line 43, " "M=" and "M=" keys " should read --"M$\doteq$" and "M$\pm$" keys--; and
Line 60, "switchs" should read --switches--.

COLUMN 5

Line 27, "is" should read --in--.

COLUMN 6

Line 42, "3.7. The" should read --3.7, the--.

UNITED STATES PATENT AND TRADEMARK OFFICE
CERTIFICATE OF CORRECTION

PATENT NO. : 4,970,673

DATED : November 13, 1990

INVENTOR(S) : Hiroyuki Ueda

It is certified that error appears in the above-identified patent and that said Letters Patent is hereby corrected as shown below:

COLUMN 10

Line 11, "from said output" should be deleted.

Signed and Sealed this

Thirtieth Day of June, 1992

Attest:

DOUGLAS B. COMER

Attesting Officer

Acting Commissioner of Patents and Trademarks